Patented Dec. 21, 1937

2,102,965

UNITED STATES PATENT OFFICE 2,102,965

MANUFACTURE OF UNSATURATED ALDEHYDES

Walter Christian Meuly, New Brunswick, N. J., assignor to E. I. du Pont de Nemours & Company, Wilmington, Del., a corporation of Delaware No Drawing. Application April 20, 1936, Serial No. 75,415

14 Claims. (Cl. 260—136)

This invention relates to the manufacture of aldehydes. More particularly, this invention relates to the synthesis of unsaturated aldehydes, wherein an aldehyde of the general formula $R_1$—$CH_2$—CHO is condensed with an aldehyde of the general formula $R_2$—CHO, in the presence of alkaline condensing agents according to the general scheme:

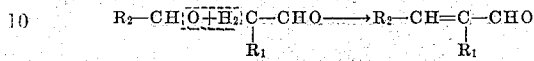

$R_1$ and $R_2$ being alkyl, aralkyl or aryl radicals.

It is an object of this invention to provide an improved process for effecting syntheses of the above general type. It is a further object of this invention to provide a process for synthesizing unsaturated aldehydes, characterized by high yields and improved overall efficiency. It is a further object of this invention to produce novel unsaturated aldehydes. Other and further important objects of this invention will appear as the description proceeds.

It has been customary in the art to carry out the reaction above indicated by starting with the free aldehydes in pure form. This necessitated the steps of preparing and isolating the initial material in pure form. Moreover, the yield has not always been satisfactory due to the formation of aldol condensation products and various resinous by-products.

In U. S. Patent No. 1,716,822, it has been proposed to solve the latter difficulty by carrying out the reaction in an alcoholic medium containing less than half of its weight of water; in other words, alcohol of at least 66.7% concentration. In the actual examples set forth in said patent, the use of 96% alcohol to absolute alcohol is prescribed.

In British Patent No. 284,458 and German Patent No. 553,037 which are the corresponding foreign duplicates of U. S. P. 1,716,822, it has been emphasized that the success of the reaction depends upon the maintenance of a single phase throughout the reaction. This condition is brought about by the use of substantially anhydrous alcohol and of caustic potash, both of which are expensive. Moreover, the yields obtainable by the process of this patent are still far from the theoretical.

Now, I have found that the condensation of two aldehydes in the presence of an alkaline condensing agent proceeds with an unusual degree of efficiency and substantially without the formation of by-products, if at least one of the aldehydes employed is in the form of its bisulfite compound.

In my preferred mode of procedure, an aldehyde bisulfite compound is fed gradually into a solution of caustic alkali, which may or may not contain another aldehyde. Where the alkaline solution does not contain another aldehyde, the latter may be fed in simultaneously with the first aldehyde, either in the free —CHO form, or in the form of a bisulfite compound. The second aldehyde may be the same as the first, the reaction in that case being directed toward self-condensation between two molecules of the same aldehyde.

As is well known, caustic alkali will decompose an aldehyde bisulfite. I have found, however, that the aldehyde thus liberated is in a specially reactive or nascent form, which condenses rapidly with the other aldehyde, without the formation of aldol by-products. This accentuated reactivity may be observed not only when the aldehyde bisulfite is the one which is designed to furnish the O atom in the condensation above formulated (that is, the compound designated as R—CHO), but also when it is the one designed to furnish the $H_2$ group (designated above as $R_1$—$CH_2$—CHO).

Evidently, the decomposition of the bisulfite compound by the alkali does not liberate simply the aldehyde in free CHO form, but generates it in a very special, reactive form; perhaps in the form of its hydrate (R—$CH(OH)_2$).

It will be understood, however, that the latter theory is advanced merely for the sake of explaining this invention better, but that I do not desire to be limited thereby.

It is an advantage of my novel process that the aldehyde is never present in free form except in very small amounts. If this aldehyde contains a $CH_2$ group next to the CO group the danger of undesired self-condensation is eliminated, because there is present at every moment a large excess of the second aldehyde.

As alkaline medium, one may select an aqueous, alcoholic, or aqueous-alcoholic solution of a suitable alkaline condensing agent. A two-phase medium consisting of an aqueous solution of the alkaline agent with a water-immiscible organic diluent, may also be employed.

I find that in my process the formation of two phases in the reaction vessel during the course of the reaction is no detriment to the yield; consequently, I am at liberty to employ in a dilute alcohol medium sodium hydroxide as alkaline condensing agent, in place of potassium hydroxide. The selection of caustic soda, of course, bears an economic advantage.

The question, which aldehyde is to be employed as the bisulfite compound, will generally be governed by economic considerations. Since most aldehydes are prepared by a process involving intermediate conversion into the bisulfite compound for the sake of recovery or purification, it is convenient to use as initial material the crude bisulfite product, directly as obtained at this stage, without first recovering the free aldehyde form. This is a particularly valuable advantage of my novel process, because it enables the synthesis to proceed from crude, and therefore cheaper, material.

If desired, both aldehydes may be employed as bisulfites, thereby reducing the cost of both initial materials.

Without limiting my invention to any particular procedure, the following examples are given to illustrate my preferred mode of operation. Parts mentioned are by weight.

*Example 1*

An aqueous-alcoholic caustic solution is prepared by dissolving 32 parts of sodium hydroxide in 80 parts of water and 300 parts of methanol. 85 parts of this solution are mixed with 106 parts of benzaldehyde. Into this mixture are added simultaneously over a period of 4 hours at ordinary temperature the remainder of the aqueous alcoholic caustic solution and 115 parts of crude n-octylic aldehyde bisulfite compound finely powdered, as may be obtained, for instance, by treating according to the methods known to the art, crude n-octyl aldehyde with a slight excess of sodium bisulfite and washing the precipitate of crude n-octylic aldehyde bisulfite compound with an organic solvent on a filter until all organic impurities have been removed and drying the moist crystals. When the addition is complete the reaction mass is stirred for one-half hour longer at room temperature. 1,000 parts of cold water are added and the oily condensation product is isolated and distilled in a vacuum. There is obtained, besides recovered benzaldehyde and 3 parts of residue (a non-distillable viscous oil), 71 parts of alpha-hexyl-cinnamic-aldehyde of excellent purity.

The reaction involved above may be represented by the following equation:

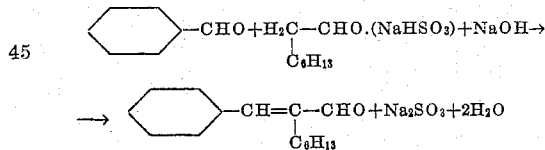

*Example 2*

If, in Example 1, the 115 parts of n-octyl aldehyde-bisulfite compound are replaced by the equivalent of 174 parts of the moist crystals as may be obtained by washing the crude bisulfite compound with methanol without subsequent drying, identical results are obtained.

The methanol of Experiment 2 may be replaced by other solvents such as ethanol, ethyl ether or benzol, without changing the results.

*Example 3*

A solution is prepared by dissolving 80 parts potassium hydroxide in 300 parts of water and 500 parts of methanol. 200 parts of this solution are added to 150 parts of benzaldehyde. Over a period of 3 hours there is gradually added at 25 to 30° C. the remaining 680 parts of the alkali solution and simultaneously the equivalent of 79 parts of n-heptylic aldehyde in the form of its sodium bisulfite compound. The reaction mass is diluted with 1500 parts water and the reaction product isolated according to known methods. After purification by distillation in a vacuum, there is obtained 120 to 124 parts of pure alpha-amyl-cinnamic-aldehyde and 72 parts of benzaldehyde.

Alpha-amyl-cinnamic aldehyde may be represented by the following formula

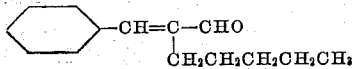

*Example 4*

If, in Example 3, the bisulfite compound of n-heptylic aldehyde is replaced by the bisulfite compound which is equivalent to 106 parts of citronellal, a new compound is obtained in good yield, having a boiling point of 129 to 131° at 2 mm. pressure and a refractive index $n20$ of 1.5435 and possessing probably the formula:

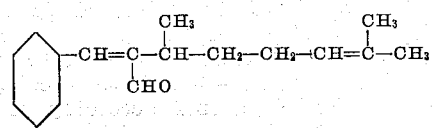

This compound appears to have valuable properties for the manufacture of perfumes.

*Example 5*

A solution is prepared from 90 parts of sodium hydroxide, 450 parts of water and 750 parts of ethyl alcohol. 300 parts of this mixture are added to 266 gm. of cuminic aldehyde and over a period of 3 hours are added at ordinary temperature, simultaneously, the remaining 990 parts of alkali solution and 243 parts of finely powdered bisulfite compound of propionic aldehyde (equivalent to 87 parts of propionic aldehyde). When the addition is complete, the reaction mass is kept for one-half hour longer at 20 to 30° C. After diluting with 2,000 parts of cold water, most of the reaction product separates out as a yellowish oil. After distilling in a vacuum, there is obtained, for instance, besides 10 parts of residue, 100 parts of unchanged cuminic aldehyde and 202 parts of para-isopropyl-alpha-methyl-cinnamic aldehyde having a boiling point of 115 to 120° C. at 2 mm. of mercury.

During the course of the addition, the reaction mass separates into two distinct layers: an upper oily one containing most of the reaction product, and a lower aqueous one containing most of the inorganic salts.

The reaction in the above example may be represented by the following equation:

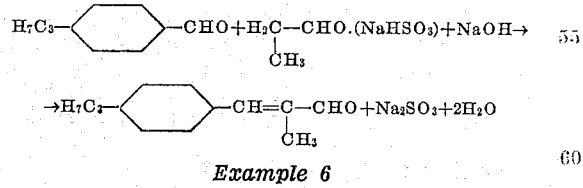

*Example 6*

An aqueous-alcoholic solution of potassium hydroxide is prepared by dissolving 126 parts of potassium hydroxide in 450 parts of water and 300 parts of methanol. 150 parts of this mixture are added to 350 parts of methanol. Over a period of four hours there are added simultaneously at 25° C. (1) the remaining 726 parts of alkali solution, (2) 131 parts of propionic aldehyde, and (3) 505 parts of crude bisulfite compound of cuminic aldehyde, such as may be obtained when crude cuminic aldehyde is purified by converting it into its bisulfite compound according to the processes well known to those skilled in the art. After additions are completed, the reaction mixture is kept at ordinary temperature for 15 minutes longer. The reaction product is fractionated under vacuum, and there is obtained 60 parts of cuminic aldehyde and 190 parts of pure para-isopropyl-alpha-methyl cinnamic aldehyde.

Example 7

If the initial 876 parts of aqueous-alcoholic-caustic solution of Example 6 are replaced by an aqueous solution prepared by dissolving 140 parts of potassium hydroxide in 600 parts of water and carrying out the condensation as described in Example 6, a similarly good yield of para-isopropyl-alpha-methyl cinnamic aldehyde is obtained, although the ratio of recovered cuminic aldehyde is higher. The potassium hydroxide may be replaced by an equivalent amount of sodium hydroxide.

Example 8

A solution is prepared by dissolving 140 parts of sodium hydroxide in 440 parts of water and 660 parts of methanol. Of this solution 240 parts are placed in the reaction vessel. To this are added simultaneously over 4 hours (1) the remaining 1,000 parts of alkali solution and (2) a mixture of the respective bisulfite compounds equivalent to 148 parts of cuminic aldehyde and to 70 parts of propionic aldehyde. After the addition is complete, the reaction mixture is diluted with 1,000 parts of water. The oily reaction product is purified by vacuum distillation and a good yield of pure para-isopropyl-alpha-methyl-cinnamic-aldehyde is obtained.

Example 9

A solution is prepared by dissolving 32 parts of sodium hydroxide in 150 parts of water and 100 parts of methanol.

A reaction vessel is charged with 50 parts of this alkaline solution and with 10 parts of propionic aldehyde in 100 parts of methanol. To this mixture is added simultaneously over 2 hours at room temperature the rest of the alkaline solution, 39 parts of propionic aldehyde and 57 parts of heptylic aldehyde, the latter being in the form of its bisulfite compound. The reaction mass upon fractionation yields, besides some unchanged propionic aldehyde and heptylic aldehyde, mostly the propionic-aldehyde-heptylic-aldehyde condensation product boiling at 76 to 82° C. at 3 mm. of mercury absolute pressure.

The reaction product is probably a mixture of two isomeric aldehydes of the following formulas:

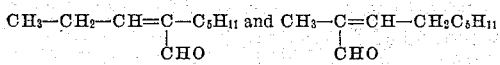

Example 10

A solution is prepared from 92 parts potassium hydroxide, 276 parts water and 184 parts methanol. Into the reaction vessel are placed 300 parts methanol and 110 parts of the above alkali solution. At room temperature there are added simultaneously over two hours (1) the rest of the alkali solution, (2) 80 parts propionic aldehyde and (3) 282 parts of the bisulphite compound of piperonal. From the reaction product are isolated by fractional distillation 60 parts piperonal and 105 parts alpha-piperonylidene propionic aldehyde which is a pale yellow solid, melting at 64 to 65° C.

Its structure may be represented by the following formula:

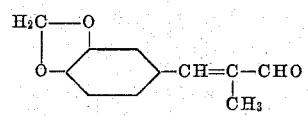

It will be understood that the details of procedure are susceptible of wide variation and modification without departing from the spirit of this invention. Thus, while I have preferred to employ sodium hydroxide and potassium hydroxide, any other alkaline condensing agent customarily employed in the art for this type of reaction, for instance alkaline earth hydroxides, may be used.

The bisulfite compound may be in the form of its sodium, potassium or ammonium salt. As already indicated, it need not be pure. In fact, the preferred method consists in using the intermediate products which are obtained in the process of purifying crude aldehydes. The bisulfite compounds may contain excess sodium bisulfite, water, or organic solvents.

The ratio of reacting materials may be varied within wide limits. As a rule, the aldehyde which is in free form is to be used in an excess, so as to completely consume the more valuable bisulfite compound. A reasonable excess varies from 0% to 100%. The alkaline condensing agent is usually employed in such a quantity that after conversion of the alkali bisulfite into alkali sulfite there remains enough alkali to effect condensation at room temperature. 1 to 2 moles of alkali per mole of bisulfite generally gives good results.

The preferred liquid medium for the reaction is one in which free aldehyde and bisulfite compound are both soluble. This is usually an aqueous-alcoholic mixture, the preferred alcohols being methanol, ethanol, propanol, glycol or mixtures of water miscible solvents. While the best solvent concentration is between 40% and 80%, the process is operative for all concentrations from water to anhydrous solvents, for instance benzol, ethyl ether, and the like, provided the alkaline condensing agent is added in the form of an aqueous or alcoholic solution.

The order of mixing the materials may be varied considerably, the preferred method being to add the bisulfite compound and condensing agents gradually to the free aldehyde so as to avoid the presence of high concentrations of condensing agent in the reaction mass. This order, however, may be varied considerably, for instance, by adding the condensing agent to a mixture of free aldehyde and aldehyde-bisulfite compound or reacting simultaneously condensing agent, aldehyde and aldehyde-bisulfite compound.

The optimum temperature is about the same as has been customary in the art for this synthesis, although wider variation is permissible. Temperatures from 0° to 50° C. were tried and found successful. Higher or lower ones may be found satisfactory if the amount of condensing agent or the time are adjusted. The usual time is from 1 to 5 hours. The additions should be slow enough to cause complete reaction of the previously added bisulfite compounds, before the next addition.

The isolation of the reaction product may likewise follow standard practice. The most convenient way consists of diluting the reaction mass with water to dissolve the inorganic salts formed and separating the insoluble oily condensation product. For quantitative recovery, it is advisable to extract the mother liquor with a solvent like ether or benzol. An alternative method consists of distilling off the alcoholic solvent, under partial neutralization of the reaction mass, if necessary, followed by separation or extraction of the condensation product.

The above process may be applied to the conversion of any aldehyde or pair of aldehydes from the aliphatic, aromatic or hydroaromatic series, provided at least one of the aldehydes so chosen possesses a $CH_2$ group in 2-position (the group CHO being counted as 1).

It will be understood from the preceding discussion that I have provided a very economical and efficient method for the production of unsaturated aldehydes. As is well known, the less common aldehydes are usually purified by conversion into their bisulfite compounds, followed by liberation with alkaline or acid agents. This liberation always involves some losses of the sensitive aldehydes due to attack by the above mentioned agents. The liberated aldehydes therefore have often to be further purified by fractional distillation.

According to my invention, the steps and losses involved in the liberation and distillation of the aldehyde are avoided, since decomposition and condensation are carried out in the same vessel, either simultaneously or in immediate succession.

Furthermore, my process is characterized by higher yields of the desired end-product, based on the more expensive of the two aldehydes employed as initial material. In computing this yield as a numerical percentage, it should be borne in mind that the available quantity of aldehyde in a given weight of bisulfite is not that which theoretically corresponds to the formula $R.CHO.SO_3Na$, but that quantity which could be recovered from the given weight of the bisulfite compound by employing known methods of hydrolysis, as for instance by the aid of alkali. This quantity is generally less than the theoretical maximum due to the losses of aldehyde above mentioned. When this available quantity is used as a basis, my process leads to nearly theoretical yields. In any event, the yields by my process exceed considerably those mentioned in the art, including U. S. P. 1,716,822, which in itself claims considerable improvement over the yields of the art.

In the claims below it will be understood that the phrase "an unsaturated aldehyde of the cinnamic aldehyde series" refers to a compound containing in its structure the radical

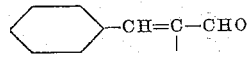

and which may therefore be looked upon as a substitution derivative of cinnamic aldehyde; said phrase including, of course, cinnamic aldehyde itself.

I claim:

1. The process of producing an unsaturated aldehyde, which comprises reacting an aldehyde bisulfite having a $CH_2$ group next to the aldehyde radical with an aromatic aldehyde in a liquid medium and in the presence of an alkaline condensing agent.

2. The process of producing an unsaturated aldehyde, which comprises reacting two aldehydes of which at least one has a $CH_2$ group next to the CHO group, and of which at least one is in the form of its bisulfite compound, in a liquid medium and the presence of an alkaline condensing agent.

3. The process of producing an unsaturated aldehyde, which comprises bringing in contact, in aqueous-alcoholic medium and in the presence of an alkaline condensing agent, an aldehyde containing the grouping $-CH_2-CHO$ and an aldehyde containing a $-CHO$ group, at least one of said aldehydes being in the form of its bisulfite compound.

4. The process of producing an unsaturated aldehyde, which comprises feeding the bisulfite compound of an aldehyde having a $CH_2$ group next to the aldehyde radical into an aqueous alcoholic solution of caustic alkali, and recovering the reaction product.

5. The process of producing an unsaturated aldehyde, which comprises feeding the bisulfite compound of an aldehyde having a $CH_2$ group next to the aldehyde radical into an aqueous alcoholic solution of caustic alkali containing an aromatic aldehyde, and recovering the reaction product.

6. The process of producing an unsaturated aldehyde, which comprises feeding the bisulfite compound of an aldehyde and at least one other aldehyde, one of said aldehydes having a $CH_2$ group next to the aldehyde radical, into an aqueous-alcoholic solution of caustic alkali, and recovering the reaction product.

7. A process as in claim 6, the second aldehyde being likewise in the form of a bisulfite compound.

8. The process of producing an unsaturated aldehyde, which comprises bringing into contact, in a liquid medium, an aliphatic aldehyde having a $CH_2$ group next to the aldehyde radical and an aromatic aldehyde of the benzene series, in the presence of an alkaline condensing agent, at least one of said aldehydes being in the form of its bisulfite compound.

9. A process as in claim 8, the aldehyde bisulfite being mixed gradually and in small quantities with the other materials.

10. A process as in claim 8, the reaction being effected in a medium of the group consisting of water, alcohol, and mixtures of the two.

11. The process of producing an unsaturated aldehyde, which comprises feeding the bisulfite compound of an aliphatic aldehyde having from 3 to 10 carbon atoms having a $CH_2$ group next to the aldehyde radical into an aqueous-alcoholic solution of caustic alkali containing an aldehyde of the benzene series, diluting the reaction mass with water and recovering the formed oily condensation product.

12. The process of producing an unsaturated aldehyde, which comprises feeding the bisulfite compound of citronellal into an aqueous-alcoholic solution of caustic alkali containing benzaldehyde, diluting the reaction mass with water, and recovering the oily condensation product.

13. The condensation product of citronellal bisulfite and benzaldehyde.

14. The compound of the formula

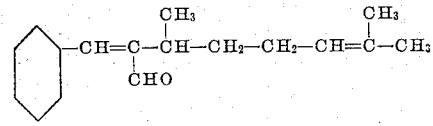

said compound being a liquid boiling at about 129 to 131° C. at 2 mm. absolute pressure.

WALTER CHRISTIAN MEULY.